3,296,516
VOLTAGE REGULATOR
William A. Paine II, 2401 S. Bayview, Seattle, Wash. 98144, and Lee R. Bauscher, 5123 S. Avon St., Seattle, Wash. 98178
Filed Mar. 23, 1964, Ser. No. 353,831
5 Claims. (Cl. 320—35)

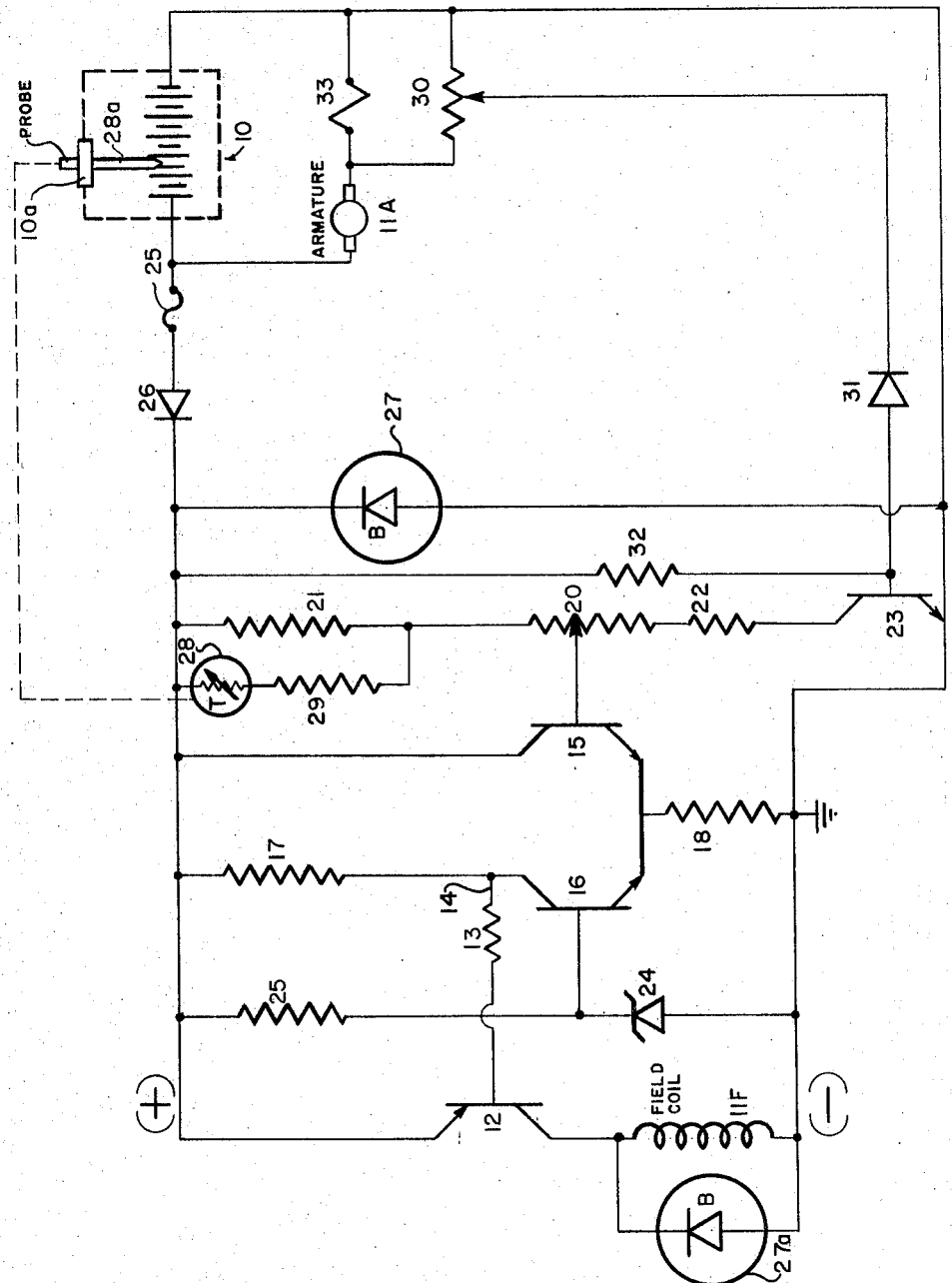

The present invention relates to an improved voltage regulator for self sustaining D.C. systems of the conventional battery-generator or battery-alternator types normally employed in automobiles and boats for powering starters, auxiliary motors, lights, and a variety of electronic gear, and more particularly relates to a voltage regulator employing semiconductors so as to be devoid of relays or other moving parts.

Important objects of the invention are to provide an improved such voltage regulator of simple and economical construction, which is reliable, accurate, sensitive, fast and safe in operation, long lived, and easily adjusted.

Another significant object relates to the expanding use of high current alternators to handle the ever increasing loads being placed on vehicle and marine D.C. systems, and the characteristic in a lead acid battery of the terminal voltage to decrease with increasing battery temperature. This characteristic has been ignored even though considerable internal heat is developed in charging a battery, particularly when a high charging rate is present as when the charging is accomplished by a high current alternator. In fact, a 32 volt bank, common in marine use, has about 2.3 volts drop in terminal voltage per 100° F. temperature rise. Accordingly, with no correction to the voltage regulator setting during a high charging rate the full charge condition of the battery is likely to be exceeded thereby causing excess gassing, plate breakdown, shorts, etc., resulting in shortened battery life.

With this problem in mind the present invention also aims to provide a voltage regulator which automatically adjusts and compensates for battery temperature changes.

Another important object of the invention is to provide a voltage regulator having a sensitive control for automatically limiting the battery charging current.

Other more particular objects and advantages of the invention will, with the foregoing, appear and be understood in the course of the following description and claims, the invention consisting in the novel construction and in the adaptation and combination of parts hereinafter described and claimed.

Referring to the schematic shown as the single figure of the drawing, it will be noted that the battery, and the field coil and armature of the generator or alternator, are designated 10, and 11F and 11A, respectively. A PNP power transistor 12 is located in series with the field coil 11 and has a current limiting resistance 13 located between its base and the output 14 of a differential amplifier of the single-sided output type. This amplifier comprises a pair of NPN transistors 15–16, resistors 17 and 18, and a resistance-type voltage divider 20 having its tap leading from the base of the transistor 15. The differential amplifier may be unbalanced, i.e. the collector of the transistor 15 is connected directly to the positive bus rather than via a resistor to give full gain at the output 14. Supplementing the resistance of the voltage divider 20 in series relation thereto is a pair of resistors 21–22 together with a transistor 23 which is part of a battery current limiting a portion of the circuit to be later described.

Complementing the voltage divider at the opposite side of the differential amplifier is a very accurate voltage reference taking the form of a Zener diode 24. This diode is located between the negative bus and the base of the transistor 16, and a resistor 25 is inserted between such base and the positive side of the circuit.

An important feature of the present invention is the providing of a thermistor 28 with together with a resistor 29 is placed in parallel relation to the resistor 21. The thermistor is housed in a stainless steel tube 28a closed at its lower end to form a probe. This probe is inserted in a central cell of the battery bank 10 so as to be sensitive to internal heat changes in the battery. To install the probe a hole may be bored through one of the battery cell caps 10a so that the cap can be snugly sleeved onto the upper end of the tube 28a, thereby suspending the probe from a cap when the cap is on the battery.

A voltage reference diode 24 is selected having a voltage drop of about one-half the battery voltage. In setting for use, the tap of the voltage divider 20 is adjusted, with the thermistor 28 in an environment of normal operating atmosphere temperature and the battery bank fully charged, until the system is balanced, i.e. there is no current flow from the power transistor 12 through the field coil 11F. With the system then in operation, whenever a load is newly placed on the battery or is increased the resulting voltage drop increment, although perhaps very small, is immediately sensed by the differential amplifier.

The resulting output current signal at 14 is further amplified by the transistor 12, and hence the field coil 11F receives a large surge of current even when there is only a very slight increase in the load condition. As a result the power generating device achieves a substantial output condition almost simultaneously with an increase in load condition. When the load on the electrical system decreases the voltage regulator exhibits the same sensitivity in cutting off the field current as it did in triggering it.

Continuing to the operation of the thermistor, whenever the temperature of the battery increases and the resistance of the thermistor responsively decreases, the original full charge setting of the voltage divider 20 is in effect modified to a lower voltage to balance the reference voltage of diode 24. This is as it should be because a full charge of a battery is at a lesser voltage at higher temperatures. For example, a 32 volt battery bank will have a terminal voltage of about 37 volts at 70° F. and only about 34.7 volts at 170° F. Accordingly, the thermistor and related resistances are selected so that the rate of change of voltage setting of the regulator due to temperature increase will be about the same as the rate of change in terminal voltage of the battery due to such temperature increase. By this arrangement it is impossible to overcharge the battery.

If the probe of the thermister 28 or the leads thereto are damaged causing a short, the thermistor resistance will become zero and this will correspond to a high battery temperature condition. Hence, the result of the short will merely be a lower voltage setting. If on the other hand an open circuit is caused in the thermistor leads, the effect would be to eliminate the resistance of the thermistor and the resistor 29. But this would only raise the setting of the regulator about 1½%, not enough to harm the battery if detected within a reasonable time, as at the next periodic battery check.

Directing attention to the battery current limiting feature of the present invention, such includes a potentiometer 30 having its tap connected to the positive bus via a stabistor 31 and resistor 32, and also connected to the base of the transistor 23 via the stabistor. The potentiometer is provided with a shunt 33 which together with the armature 11A parallels the battery 10. A small current normally flows through the resistor 32, stabistor 31, and potentiometer 30 to produce a bias for the transistor 23 to keep it fully conducting unless a maximum charging current limit is reached. If the charging current of the battery rises above this limit the transistor 23 is gradually cut off and in effect, the resistance of the lower or negative leg of the voltage divider 20 is responsively increased. The result is the same as if the tap of the divider 20 were moved toward the positive bus, i.e. the full charge setting is lowered. This change is immediately sensed by the differential amplifier and as a result the current to the field coil 11F is immediately materially reduced even when the battery charging current has only risen very slightly above the predetermined maximum level determined by the setting of the tap on the potentiometer 30. Accordingly, the battery charging rate is automatically decreased sufficiently to keep the battery current below the preset limit.

To fully protect the circuit a fuse 25 and a diode 26 are positioned between the battery 10 and the positive bus, and in addition, the circuit is provided with thyrectors 27–27a or other suitable overload protectors for the transistors. These thyrectors are arranged to short the circuit when the voltage exceeds a predetermined maximum limit, and to immediately short-circuit if the voltage regulator is accidentally installed backwards. As added protection in case of such an error the diode 26 prevents completion of the circuit.

It is thought that the invention will have been clearly understood from the foregoing detailed description. Changes in the details of construction will suggest themselves and may be resorted to without departing from the spirit of the invention, wherefore it is our intention that no limitations be implied and that the hereto annexed claims be given a scope fully commensurate with the broadest interpretation to which the employed language admits.

What we claim is:

1. A voltage regulator for use with an electrical generating means having a field coil and an armature to charge a battery which comprises power transistor means adapted to be connected in series with said field coil; amplifier means, responsive to a differential voltage between said battery and a reference voltage, having an output connected to a base of the power transistor means and an input, and having a voltage divider adapted to be connected in parallel with said battery with a tap connected to said input; and a current limiting means comprising a transistor connected in series with said voltage divider and adapted to be biased by battery charging current until a predetermined battery charging current is reached.

2. A voltage regulator according to claim 1, including voltage reference diode means; and wherein said amplifier means has a pair of inputs, one being connected to said voltage divider tap and the other being connected to said voltage reference diode means, and produces an amplified current output responsive to the differential voltage across its inputs.

3. A voltage regulator according to claim 1 including potentiometer means connectable in series with said armature and having a tap connected to a base of said current limiting transistor means.

4. A voltage regulator according to claim 1 including thermistor means connected in series with said voltage divider and adapted to be inserted into said battery to sense the battery fluid temperature.

5. A voltage regulator for use with an electrical generating means having a field coil and an armature to charge a battery which comprises power transistor means adapted to be connected in series with said field coil; amplifier means, responsive to a differential voltage between said battery and a reference voltage, having an output connected to a base of the power transistor means and a pair of inputs, voltage reference diode means connected to one of said outputs, a voltage divider adapted to be connected in parallel with said battery with a tap connected to the other of said inputs, said amplifier means producing an amplified current output responsive to the differential voltage across its inputs, and thermistor means connected in series with said voltage divider and adapted to be inserted into said battery to sense battery fluid temperature; and a current limiting means comprising a transistor connected in series with said voltage divider and adapted to be biased on in a normally conducting state by battery charging current until a predetermined battery charging current is reached and a potentiometer connectable in series with said armature having a tap connected to a base of the current limiting transistor.

References Cited by the Examiner

UNITED STATES PATENTS

| 2,967,988 | 1/1961 | Seright | 320—36 |
| 3,059,167 | 10/1962 | Byles | 322—73 X |
| 3,069,616 | 12/1962 | Curtis | 322—73 X |
| 3,176,210 | 3/1965 | Bethke | 320—40 |
| 3,193,751 | 7/1965 | Cadiou | 320—61 X |

JOHN F. COUCH, *Primary Examiner.*

S. WEINBERG, *Assistant Examiner.*